Dec. 6, 1960 H. I. CHAMBERS ET AL 2,963,336
APPARATUS FOR RECORDING ON ELECTRO-SENSITIVE PAPER
Filed Dec. 16, 1957
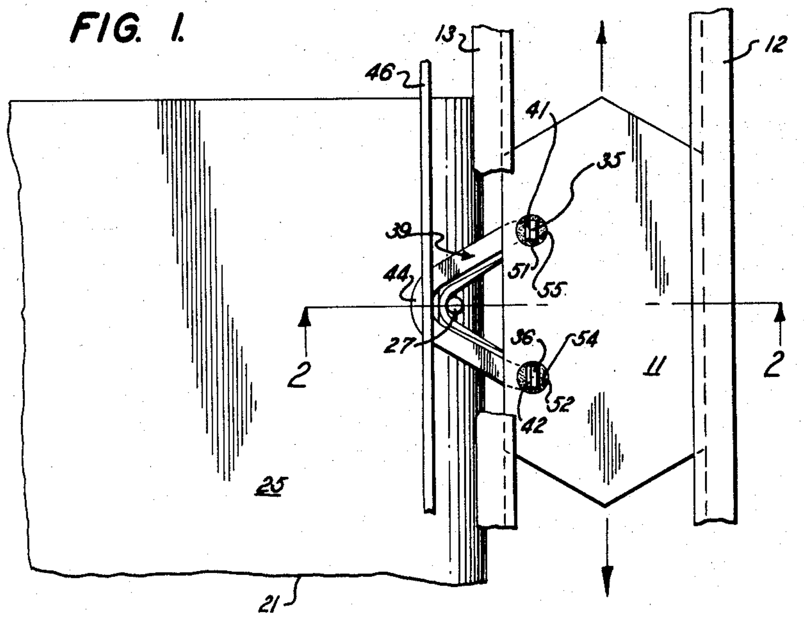
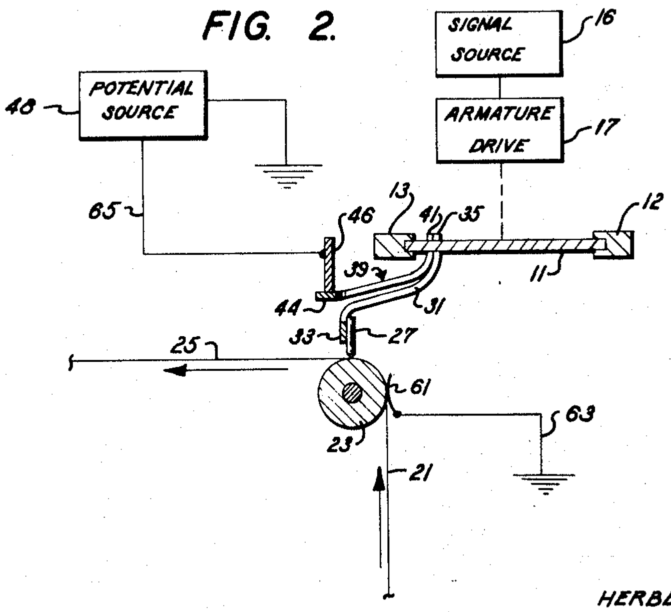
INVENTORS
HERBERT I. CHAMBERS
KAUNO E. SIHVONEN
BY
Christie, Parker & Hale
ATTORNEYS United States Patent Office 2,963,336

Patented Dec. 6, 1960

2,963,336

APPARATUS FOR RECORDING ON ELECTROSENSITIVE PAPER

Herbert I. Chambers, Pasadena, and Kauno E. Sihvonen, Arcadia, Calif., assignors, by mesne assignments, to Consolidated Electrodynamics Corporation, Pasadena, Calif., a corporation of California Filed Dec. 16, 1957, Ser. No. 703,030

5 Claims. (Cl. 346—74)

The invention relates to apparatus for recording on electrosensitive recording paper and more particularly to apparatus used in conjunction with direct writing oscillographs.

Conventionally, one form of direct writing oscillograph records the movement of a light weight moving element. The motion of the moving element is in response to signals from a source of interest. The moving element resides in a magnetic field and the frequency and magnitude of the signal causes a correlative movement of the element. In some instances the element is an armature of a simple motor. Such a motor is described in co-pending application Serial No. 615,900, filed on October 15, 1956, by H. I. Chambers, and entitled "A Fast Response Servo Recorder." A second type of motor is disclosed in co-pending application Serial No. 638,006, filed on February 4, 1957, by G. P. Wilson, and entitled "Linear Induction Motor for Recording Oscillograph."

In each of the above cited instances the armature or moving element is supported by parallel ways extending through a magnetic field. Means are provided for the armature to move a stylus across the surface of an electro-sensitive recording material. A writing current independent of the signal source is applied to the stylus in order to record the information conveyed by the movement of the armature. In the apparatus of the above described applications as well as in other similar devices a problem exists with respect to the writing current. Normally about 300 volts of D.C. current is required to inscribe a satisfactory trace on the recording material. The conventional circuitry for the so-called "writing" current includes contact brushes against the surface of the recording material and connected to the writing current source. Current flows from the paper to the scribing stylus and makes a trace. From the stylus the current flows to the armature. The armature is usually at ground potential and the circuit is closed through grounding the armature. Such circuitry means that each part of the apparatus framework which is electrically connected with the recording paper is charged. Therefore a shock hazard exists for anyone coming in contact with the framework.

We have invented apparatus which obviates the shock hazard. Additionally, the contact between the recording surface and the stylus is improved by the mounting means employed in conjunction with the unique circuitry of the writing circuit. In a recording system having an armature movable in juxtaposition to an electro-sensitive recording surface and responsive to a signal to be recorded, the invention contemplates the combination which comprises a stylus connected to move with the armature and in contact with the electro-sensitive recording surface. Means electrically insulating the stylus from the armature are provided along with a source of potential which is independent of the signal current. Means movably couple the stylus to the source of potential and additional means in contact with recording surface complete the circuit between the independent source of potential and the recording surface.

The writing current flows then from the stylus to the paper and since there is then no objection to lowering the potential of the writing current, the recording surface may be grounded. The circuit may be completed through the ground to the similarly grounded potential source.

With the recording material grounded, the hazard of a charged framework is eliminated.

Preferably a resilient arm suspends the stylus from the armature. The preferred means of movably connecting the stylus electrically to the source of potential consists of a conductive rail coextensive with the movement of the armature and a resilient brush in contact with the rail and electrically connected to the arm carrying the stylus. Both the contact brush and the resilient arm are of a light weight material so as to impose the least possible load on the armature which may support them both.

In the preferred embodiment therefore the flow of writing current is from the source of potential to the rail and thence through the contact brush to the resilient arm suspending the stylus and through the stylus to the grounded recording material. The preferred mounting means not only insures contact between the recording surface and the stylus and the contact brush and the conductive rail but also the aggregate weight is such that the sensitivity of the armature is not materially affected.

These and other advantages of the invention are apparent from the following detailed description and drawing, in which:

Fig. 1 is a schematic representation of an oscillograph utilizing the invention and shown in fragmentary plan view; and Fig. 2 is a schematic sectional elevation taken along line 2—2 of Fig. 1.

The figures represent fragmentarily a direct writing oscillograph such as described in the heretofore cited co-pending applications. An armature 11 is movably mounted in a pair of parallel ways 12 and 13. The armature reciprocates in the ways in response to a signal source 16, which alters the magnetic field of an armature drive 17 that in turn induces motion of the armature in the ways. A recording material 21 passes over a writing mandrel 23 which may rotate. The recording material has an electro-sensitive surface 25 upon which a conductive stylus 27 is movable in response to the motion of the armature.

A generally U-shaped arm 31 having a downwardly bending tip 33 supports the stylus on the recording surface. The arm has spaced upwardly bent free ends 35, 36. The free ends extend through the armature.

A generally U-shaped contact brush 39 having upwardly extending free ends 41, 42 extending upwardly through the armature has a yoke portion 44. The yoke is spring loaded against the bottom of a conducting rail 46 which extends parallel to and co-extensively with the movement path of the armature. A potential source of writing current 48 is electrically connected to the conductive rail 46.

The free ends of both the U-shaped contact brush and the substantially U-shaped arm supporting the stylus pass through common apertures 51, 52 located near an edge of the armature. Insulating members 54, 55 fill the apertures and secure the free ends of the brush and the arm to the armature. The insulating members may be formed from an insulating cement poured into the aperture about the free ends of the arm and the brush.

Preferably the free ends of the arm and the brush are in electrical contact with each other adjacent the armature. While it is possible to form the brush and the arm supporting the stylus from a single piece, it is preferable from a manufacturing standpoint if they are separately formed and then united by the insulating cement in the aperture.

The recording surface is ground by means of a contact brush 61 riding against the recording surface and connected to ground by convenient means such as lead 63.

The flow path of the writing potential is from source 48 through a lead 65 to conductive rail 46. Contact brush 39 conducts the writing potentially to arm 31 to which the stylus is mechanically and electrically connected. Stylus 27 is spring loaded against the recording surface 25 by the resiliency of arm 31 and the current flows along the recording surface which is grounded through brush 61 and lead 63. The flow of current from the stylus to the recording material causes a visible trace on recording surface 25 since the surface is electrosensitive. The recording material is grounded and thus reduces the hazard of framework charge.

The foregoing grounding arrangement is described for use in conjunction with electro-sensitive paper which is surface conductive only. Similar benefits are possible when a conductive material is used. In such a case the writing mandrel may be of a conductive material and the grounding brush 61 may contact the mandrel surface instead of the recording surface of the recording material.

Some forms of direct writing oscillographs employ a writing stylus which, as described before, is supported by the moving element. In some, the writing pressure imposes a torque load on the element. Even though the load is small, it has an effect on operation. This torque is counterbalanced in the illustrative embodiment of the invention by the friction load of the contact brush against the conductive rail.

As armature 11 is impelled in reciprocating fashion along ways 12 and 13 by the armature drive under the influence of signal source 16, the stylus is carried back and forth across the surface of the moving recording material. The trace thus scribed is directly indicative of the fluctuations from the signal source. The sensitivity inherent in the type of oscillograph of which the armature is a part is not influenced adversely by the described stylus support and writing current contact brush.

While the invention has been described with respect to a particular direct writing recording oscillograph, other similar devices may benefit from the inventive concept. The particular embodiment disclosed is illustrative only and other forms of the invention are possible within its scope.

We claim:

1. In a recording system having an armature in juxtaposition to an electro-sensitive recording surface and movable responsive to a signal current, the combination comprising a stylus, an arm suspending the stylus from the armature to move therewith in contact with the electrosensitive surface, a source of potential independent of said signal, a conductive rail coextensive with the movement of the armature, means electrically connecting the rail to the source of potential, a contact brush supported from the armature in slidable contact with the rail, means electrically connecting the brush and the arm suspending the stylus, means electrically insulating the arm from the armature, and means in contact with the recording surface to complete a circuit between the source and the surface.

2. In a recording system having an armature in juxtaposition to an electro-sensitive recording surface and movable responsive to a signal current, the combination comprising a stylus, a generally U-shaped resilient arm suspending the stylus from the armature to move therewith in contact with the electro-sensitive surface, a source of potential independent of said signal, a conductive rail coextensive with the movement of the armature, means electrically connecting the rail to the source of potential, a generally U-shaped resilient contact brush supported from the armature in slidable contact with the rail, mutual electrical contact between the arm and the brush adjacent the armature, means electrically insulating the arm and the brush from the armature, said electrically insulating means fixing the ends of the arm and the brush to the armature, and means in contact with the recording surface to complete a circuit between the source and the surface.

3. In a recording system having an armature in juxtaposition to an electro-sensitive recording surface and movable responsive to a signal current, the combination comprising a stylus connected to move with the armature and in contact with the electro-sensitive recording surface, first means electrically insulating the stylus from the armature, a source of potential independent of said signal, second means movably coupling the stylus to the source of potential, said first and second means exerting offsetting loads against the armature, and means in contact with the recording surface to complete a circuit between the source and the surface.

4. In a recording system having an armature in juxtaposition to an electro-sensitive recording surface and movable responsive to a signal current, the combination comprising a stylus, a resilient arm suspending the stylus from the armature to move therewith in contact with the electrosensitive surface, a source of potential independent of said signal, a conductive rail coextensive with the movement of the armature, means electrically connecting the rail to the source of potential, a resilient contact brush supported from the armature in slidable contact with the rail, means electrically connecting the brush and the arm suspending the stylus, means electrically insulating the arm and the brush from the armature, said electrically insulated means fixing the ends of the arms and the brush to the armature, the brush and the arm exerting mutually offsetting loads against the armature, and means in contact with the recording surface to complete a circuit between the source and the surface.

5. In a recording system having an armature in juxtaposition to an electro-sensitive recording surface and movable responsive to a signal current, the combination comprising a stylus, a generally U-shaped resilient arm suspending the stylus from the armature to move therewith in contact with the electro-sensitive surface, a source of potential independent of said signal, first means movably coupling the stylus to the source of potential, said U-shaped resilient arm and the first means exerting offsetting loads against the armature, and second means in contact with the recording surface to complete a circuit between the source and the surface.

References Cited in the file of this patent

UNITED STATES PATENTS

| | | |
|---|---|---|
| 907,235 | Herrick | Dec. 22, 1908 |
| 912,181 | Schattner | Feb. 9, 1909 |
| 1,221,780 | Wald | Apr. 3, 1917 |
| 2,647,033 | Faus | July 28, 1953 |